J. R. COYLE.
LUGGAGE CARRIER.
APPLICATION FILED JULY 7, 1910.
995,771.
Patented June 20, 1911.
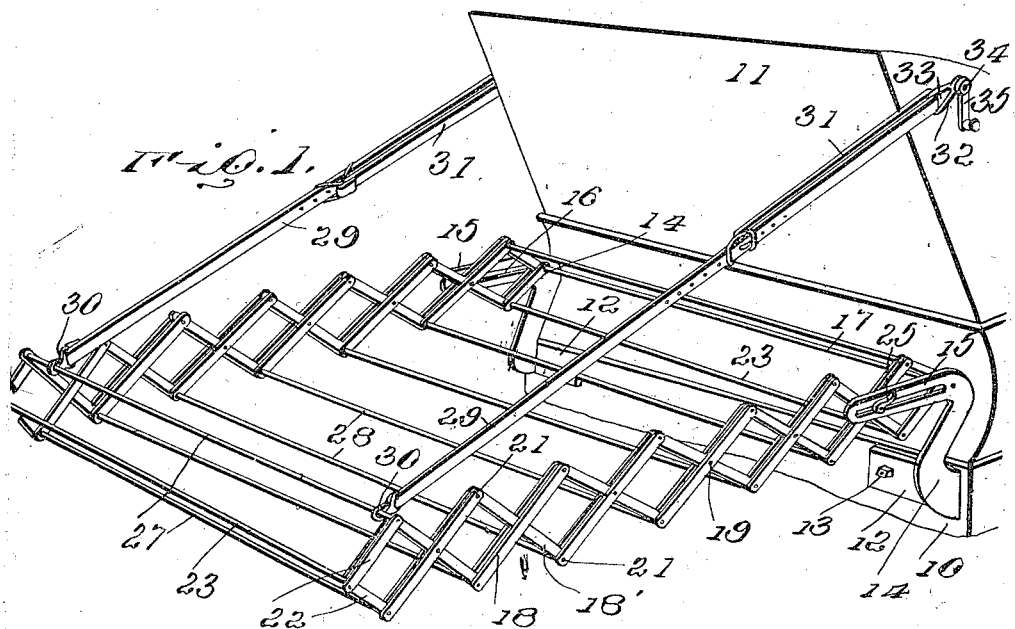
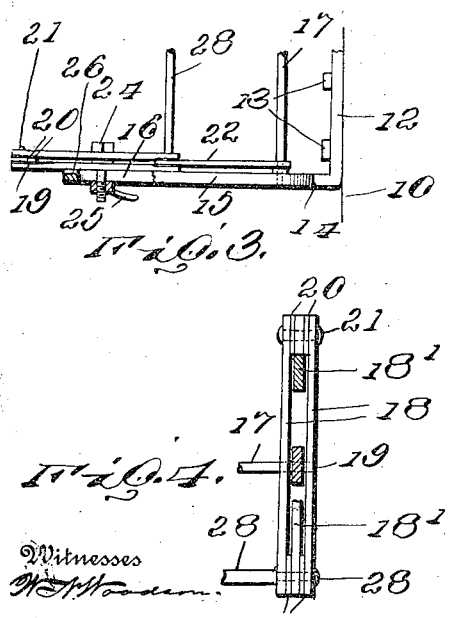
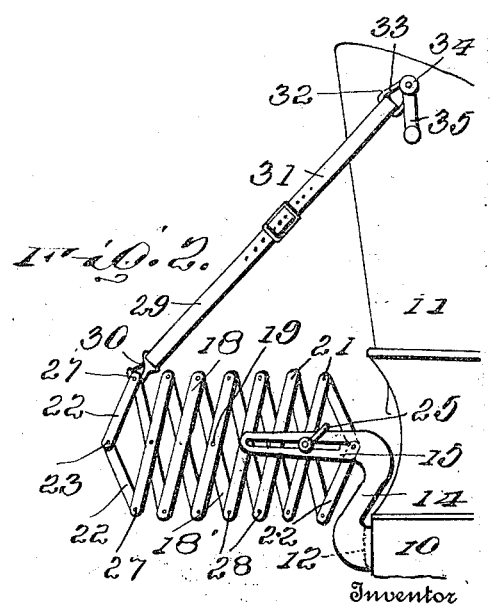
Inventor
J. R. Coyle

UNITED STATES PATENT OFFICE.

JAMES R. COYLE, OF HUNTSVILLE, ALABAMA, ASSIGNOR OF ONE-HALF TO ELMORE J. MITCHELL, OF HUNTSVILLE, ALABAMA.

LUGGAGE-CARRIER.

995,771.

Specification of Letters Patent. Patented June 20, 1911.

Application filed July 7, 1910. Serial No. 570,877.

*To all whom it may concern:*

Be it known that I, JAMES R. COYLE, citizen of the United States, residing at Huntsville, in the county of Madison and State of Alabama, have invented certain new and useful Improvements in Luggage-Carriers, of which the following is a specification.

This invention relates to luggage carriers, and refers particularly to a device of this character adaptable to motor vehicles.

The invention has for an object to peculiarly form a carrier which may be adjusted to accommodate articles varying in size, or a number of articles, which may be folded closely against the back of the motor vehicle so as not to protrude beyond the rear extensions of the vehicle.

The invention further contemplates an adjustable carrier adaptable to motor vehicles which is applied directly to the main frame of the vehicle, and which is supported or braced by flexible connections, such as straps depending from the upper edge of the tonneau or rear seat of the vehicle.

For a full understanding of the invention reference is to be had to the following description and accompanying drawing, in which:—

Figure 1 is a perspective view of the carrier as applied to the back of a vehicle. Fig. 2 is a side elevation of the same, showing the carrier partly retracted. Fig. 3 is a detail view of the adjusting means employed in connection with the carrier supports. Fig. 4 is a sectional view of one of the lazy-tong-supports.

Corresponding and like parts are referred to in the following description and indicated in all the views of the accompanying drawing by the same reference characters.

Referring to the drawings the numeral 10 designates the main frame of a motor vehicle, or the like, carrying the tonneau or the rear seat 11.

The improved luggage carrier essentially comprises a pair of oppositely formed bracket arms, the same comprising base-plates 12 engaging snugly against the rear end of the frame 10 adjacent to the sides thereof and being held in such position by bolts 13. The outer ends of the base-plates 12 are provided with upwardly extending arms 14 terminating at their upper extremities in horizontal guides 15. The guides 15 are of flattened form and are longitudinally slotted as at 16. Mounted against the inner opposite faces of the guides 15 are lazy-tong-supports which are hingedly mounted upon a transverse brace rod 17 extending between the inner ends of the guides 15 and secured through the same. Each lazy-tong-support comprises a plurality of flat bars 18 and 18′ which are crossed at their central portions and hingedly secured thereat by rivets 19.

The bars 18 are formed of spaced companion members which receive the extremities of the bars 18′ between their spaced ends. The bars 18 carry spacing washers 20 against their opposite sides to engage against the inner faces of the companion members. The extremities of the bars 18′ are hingedly connected to the adjacent bars 18 by pivots 21. The ends of the lazy-tong-supports terminate in half length bars 22 which are pivotally connected at their outer ends upon the brace rods 17 and 23 respectively. The inner, or first pair of cross bars 18 and 18′ are hingedly connected by means of a clamping bolt 24. The bolt 24 engages through the crossed portions of the bars 18 and 18′ and extends into and through the slot 16. The guides 15 thus limit the movement of the lazy-tong-supports. The outer end of the bolt 24 carries a clamping nut 25, in this instance disclosed as a crank-nut, for engagement against the outer face of the guide to bind the bars 18 against the inner face of the guide 15. The inner faces of the guides 15 are longitudinally grooved as at 26 to accommodate the heads of the rivets 19 forming the pivotal supports of the bars 18 and 18′. The outer ends of the lazy-tong-supports are provided with transverse rods 27 terminating at the hinged ends of the bars 18 and 18′ and the half-length bars 22. The rods 27 close the outer end of the carrier. The lower hinged ends of the bars 18 and 18′ are provided with rods 28 forming the bottom of the luggage carrier.

For supporting the outer end of the carrier a pair of straps 29 are employed carrying upon their lower ends suitable snap-hooks 30. The upper ends of the straps 29 are looped as at 31 to adjustably support a connection 32. The connection 32 is disclosed in the present instance in the form of a plate 33 having a transverse slot in its outer end to receive the loop 31 of the strap. The opposite end of the plate 33 is suitably apertured to engage over a supporting screw 34 carried against the side of the tonneau 11. The screw 34 is of the usual form employed in supporting the body top-iron 35.

In adjusting the carrier the clamping nuts 25 are loosened upon the bolts 24 and the lazy-tong-supports are drawn out to the desired distance to accommodate the articles or article to be carried. When the desired adjustment is effected the clamping nuts 25 are tightened upon the bolts 24 and the lazy-tong-supports are prevented from further movement. The straps 29 are now adjusted to support the outer end of the luggage carrier irrespective of the distance of the end from the frame 10.

When small articles are to be carried the luggage carrier is opened to an extent sufficient to receive the small articles. When thus adjusted the bottom bars 28 lie close to one another and practically close the bottom of the carrier to prevent the slipping of the articles through the same.

The bars 18 and 18' can be made in any suitable length in accordanc with the work which is to be done and the use to which the improved carrier is to be put.

Having thus described the invention what is claimed as new is:—

1. A luggage carrier including a pair of supports adapted for attachment to a vehicle and having horizontal arms provided with longitudinal guide grooves, lazy-tongs mounted against the inner faces of the supports and having lateral projections engaging in the guide grooves when closed, and transverse bars carried across the inner ends of the lazy-tongs to close the ends of the carrier.

2. A luggage carrier including spaced brackets having horizontal arms with longitudinal guide-grooves therein, lazy-tongs mounted against the inner faces of the brackets and having lateral projections engaging in the guide-grooves when closed, transverse bars carried across the ends of the lazy-tongs to form an open receptacle, and clamping means carried by the brackets for engagement with the lazy-tongs to rigidly secure the same in adjusted position.

In testimony whereof, I affix my signature in presence of two witnesses.

JAMES R. COYLE. [L. S.]

Witnesses:
E. J. MITCHELL,
Z. I. DRAKE.